(12) United States Patent
Lin

(10) Patent No.: US 9,226,614 B2
(45) Date of Patent: Jan. 5, 2016

(54) PORTABLE BARBECUE GRILL

(71) Applicant: China Window Industry Co., Ltd, Shenzhen (CN)

(72) Inventor: Chih Jen Lin, Shenzhen (CN)

(73) Assignee: China Window Industry Co., LTD., Shenzhen (CN)

( * ) Notice: Subject to any disclaimer, the term of this patent is extended or adjusted under 35 U.S.C. 154(b) by 198 days.

(21) Appl. No.: 14/084,791

(22) Filed: Nov. 20, 2013

(65) Prior Publication Data

US 2015/0114383 A1     Apr. 30, 2015

(30) Foreign Application Priority Data

Oct. 29, 2013   (CN) ...................... 2013 2 0671546 U

(51) Int. Cl.
*A47J 33/00*   (2006.01)
*A47J 37/07*   (2006.01)
*A47J 37/06*   (2006.01)

(52) U.S. Cl.
CPC .......... *A47J 37/0763* (2013.01); *A47J 37/0623* (2013.01); *A47J 37/0664* (2013.01); *A47J 2037/0777* (2013.01)

(58) Field of Classification Search
CPC .......................... A47J 2037/0777; A47J 37/07

USPC .................................................. 126/25 R, 9 B
See application file for complete search history.

(56) References Cited

U.S. PATENT DOCUMENTS

| 2,652,299 | A | * | 9/1953 | Bryan | 108/118 |
| 4,210,118 | A | * | 7/1980 | Davis et al. | 126/25 R |
| 7,086,395 | B1 | * | 8/2006 | Li | 126/25 R |
| 7,958,882 | B1 | * | 6/2011 | Sgourides | 126/9 R |
| 2012/0174907 | A1 | * | 7/2012 | Yeh | 126/25 R |

* cited by examiner

*Primary Examiner* — Avinash Savani
(74) *Attorney, Agent, or Firm* — Garcia-Zamor IP Law; Ruy M. Garcia-Zamor

(57) ABSTRACT

A barbecue grill includes an oven, a supporting member, and a pair of holders. The supporting member includes a panel, a first stand, and a second stand in cross connection with the first stand and pivoting on the first stand. One end of the first stand pivots on a bottom of the panel, and one end of the second stand is fixed with the bottom of the panel. The pair of holders support the oven, one end of each of the pair of holders pivots on a bottom of the oven, and another end of each of the pair of holders is fixed on the supporting member. When the pair of holders are detached from the panel, the pair of holders stack on the bottom of the oven, and when the second stand is detached from the panel, the second stand and the panel stack on the first stand.

9 Claims, 9 Drawing Sheets

PORTABLE BARBECUE GRILL

CROSS REFERENCE TO RELATED APPLICATION

This application claims priority to the following patent application: Chinese Patent Application No. CN201320671546.0 filed Oct. 29, 2013; which is hereby incorporated by reference herein as if fully set forth in its entirety.

BACKGROUND

1. Technical Field

The present disclosure generally relates to cooker units, and especially to a barbecue grill.

2. Description of Related Art

Barbecue, as an outdoor relaxation activity, becomes more and more popular with people nowadays, and is a new bright scenery of city life. Generally, a barbecue grill has a high weight and a large cubage. If a consumer wants to have a barbecue outdoors, it is not easy for the consumer to move the barbecue grill due to the high weight and the large cubage of the barbecue grill, which results inconvenience of carriage of the barbecue grill to the consumer and limitation of usage of the barbecue grill.

Therefore, a need exists in the industry to overcome the described problems.

SUMMARY

The disclosure is to solve a problem that it is not convenient for consumers to carry a barbecue grill of a prior art due to high weight and large cubage of the barbecue grill.

In order to solve the problem described above, the disclosure offers technical proposals as following.

A barbecue grill comprises an oven, a supporting member, and a pair of holders. The supporting member comprises a panel, a first stand, and a second stand in cross connection with the first stand and pivoting on the first stand. One end of the first stand pivots on a bottom of the panel, and one end of the second stand is fixed with the bottom of the panel. The pair of holders support the oven, one end of each of the pair of holders pivots on a bottom of the oven, and another end of each of the pair of holders is fixed on the supporting member. When the pair of holders are detached from the panel, the pair of holders stack on the bottom of the oven, and when the second stand is detached from the panel, the second stand and the panel stack on the first stand.

Preferably, the first stand comprises a pair of first supporting bars parallel with each other, a pair of foot seats, and a first connecting bar. One end of each of the first supporting bars pivots on the bottom of the panel, another end of each of the first supporting bars is connected with one of the pair of foot seats. The first connecting bar is connected between portions of the first supporting bars which is adjacent to the pair of the foot seats. The second stand comprises a pair of second supporting bars, a pair of wheels, a second connecting bar, and a third connecting bar, the pair of second supporting bars are respectively in cross connection with the pair of first supporting bars, and pivot with the pair of first supporting bars, respectively. The second connecting bar is connected between first ends of the pair of second supporting bars and fixed with the bottom of the panel. Two ends of the third connecting bar respectively pass through second ends of the pair of second supporting bars, and are connected with the pair of wheels, respectively.

Preferably, the panel comprises a pair of positioning blocks projecting from the bottom of the panel, and a pair of positioning sheets projecting from the bottom of the panel. Each of the pair of positioning blocks defines a latching groove in a shape of the character C. Two ends of the second connecting bar adjacent to the pair of second supporting bars are latched into the latching groove to secure the second connecting bar on the bottom of the panel, so as to secure one end of the second stand on the panel. One end of each of the pair first supporting bars pivots on a corresponding one of the pair of positioning sheets.

Preferably, the panel defines a receiving slot, a first through hole communicating with the receiving slot, and two pairs of positioning slots respectively located on two sides of the receiving slot, the other ends of the holders engage with the pairs of positioning slots, respectively, to secure the pair of holders on the panel.

Preferably, the oven comprises a body defining an open on a top of the body, a pair of opposite supporting assemblies located on two ends of the body. Each of the pair of supporting assemblies comprises a handle projecting from an exterior surface of the body, a supporting block latched with the handle, and a supporting plate located upon the supporting block and fixed with the handle.

Preferably, the handle comprises a pair of latching block parallel with each other. Each of the pair of latching blocks defines a latching groove located on a side of the latching block, and a first inserting hole located on a top of the latching block. The supporting block comprises a first positioning portion and a second positioning portion extending from a middle portion of the first positioning portion. The first positioning portion comprises a pair of projections projecting from two ends of the first positioning portion, respectively. The second positioning portion defines a second inserting hole. The pair of projections engage with the pair of latching grooves to secure the supporting block between the latching blocks of the handle. The supporting plate comprises posts projecting from a bottom of the supporting plate and corresponding to the first inserting hole and the second inserting hole. The posts respectively insert into the first inserting hole and the second inserting hole to secure the supporting plate on the oven.

Preferably, the oven defines an oil leaking hole on the bottom of the oven, and the barbecue grill further comprises an oil plate located between the panel of the supporting member and the oven and fixed on the bottom of the oven. The oil plate defines an oil receiving open opposite to the oil leaking hole of the oven. Each of the pair of holders comprises a supporting rod in a shape of an arc, and a pair of pivoting portions projecting from the supporting rod. The oven comprises a pair of pivoting sheets projecting from the bottom of the oven and corresponding to the pair of pivoting portions. The pair of pivoting portions pivot on the pair of pivoting sheets, respectively to ensure the pair of holders to pivot on the bottom of the oven.

Preferably, the oven comprises a supporting board fixed on the bottom of the oven. The supporting board defines a second through hole in communication with the oil receiving open of the oil plate. The supporting board comprises a pair of supporting strips located at two sides of the second through hole, respectively, and extending from the two sides of the second through hole and far away the oven. The oil plate comprises a pair of flanges located on two sides of the oil receiving open, and the pair of flanges are located upon the pair of supporting strips to hang the oil plate on the supporting board.

Preferably, each of the pair of supporting strips comprises a pair of stopping blocks located on two end of the supporting strip, one of the pair of flanges of the oil plates is stopped between the pair of stopping blocks of a corresponding one of the pair of supporting strips.

Preferably, the oven further comprises a cover rotatably connected with the body, and located upon the body to cover the open of the body. The cover is in a shape of an half of a ball.

It follows that, when the barbecue grill of the disclosure is unused, the first stand and the second stand of the barbecue grill folds flat, the panel stacks on the first stand and the second stand, and the holders stack on the oven for easy storage, which results in reduction of the cubage and occupied area of the barbecue grill and convenience of carriage for the consumer.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

Figure 1:
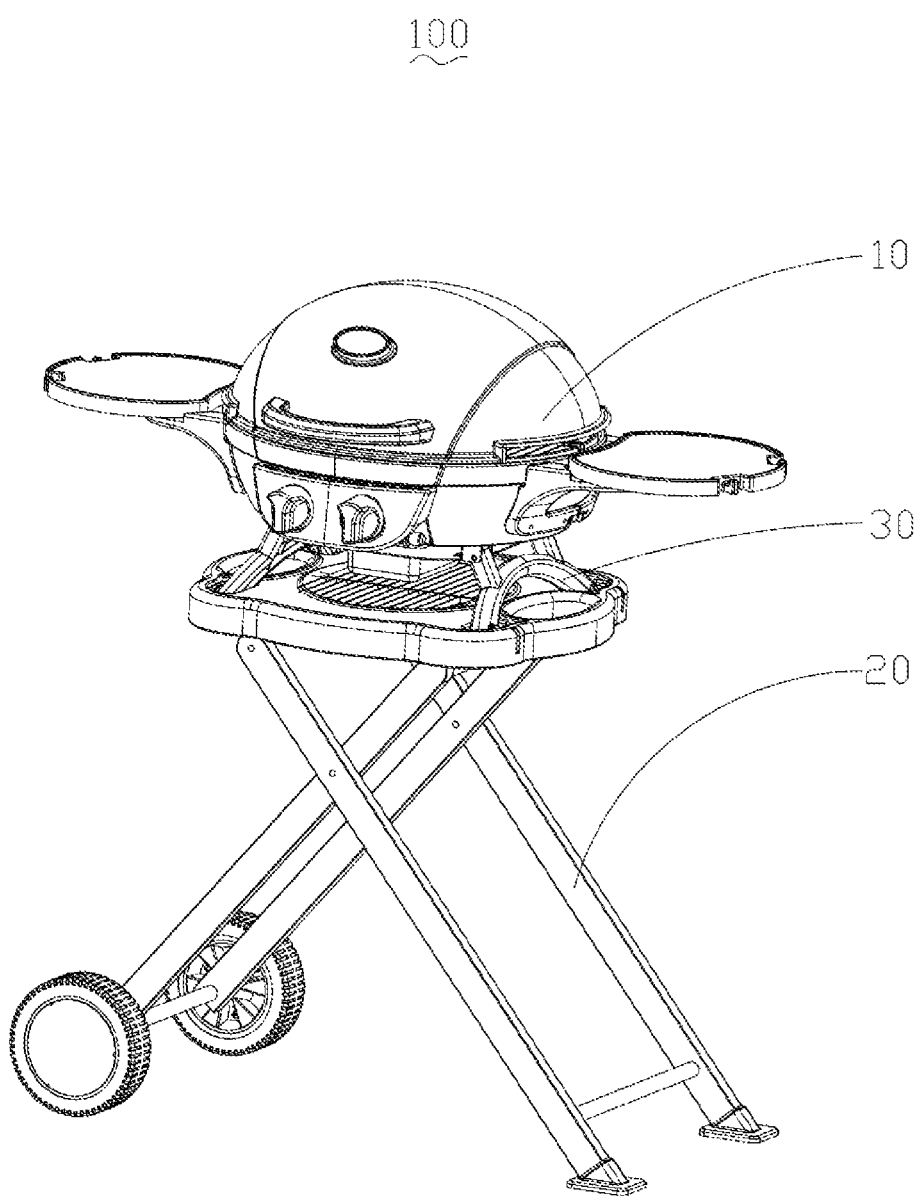
FIG. 1 is an assembled view of a barbecue grill of an exemplary embodiment of the disclosure.

The disclosure is illustrated by way of example and not by way of limitation in the figures of the accompanying drawings, in which like reference numerals indicate similar elements. It should be noted that references to "an" or "one" embodiment in this disclosure are not necessarily to the same embodiment, and such references can mean "at least one" embodiment.

Figure 2:
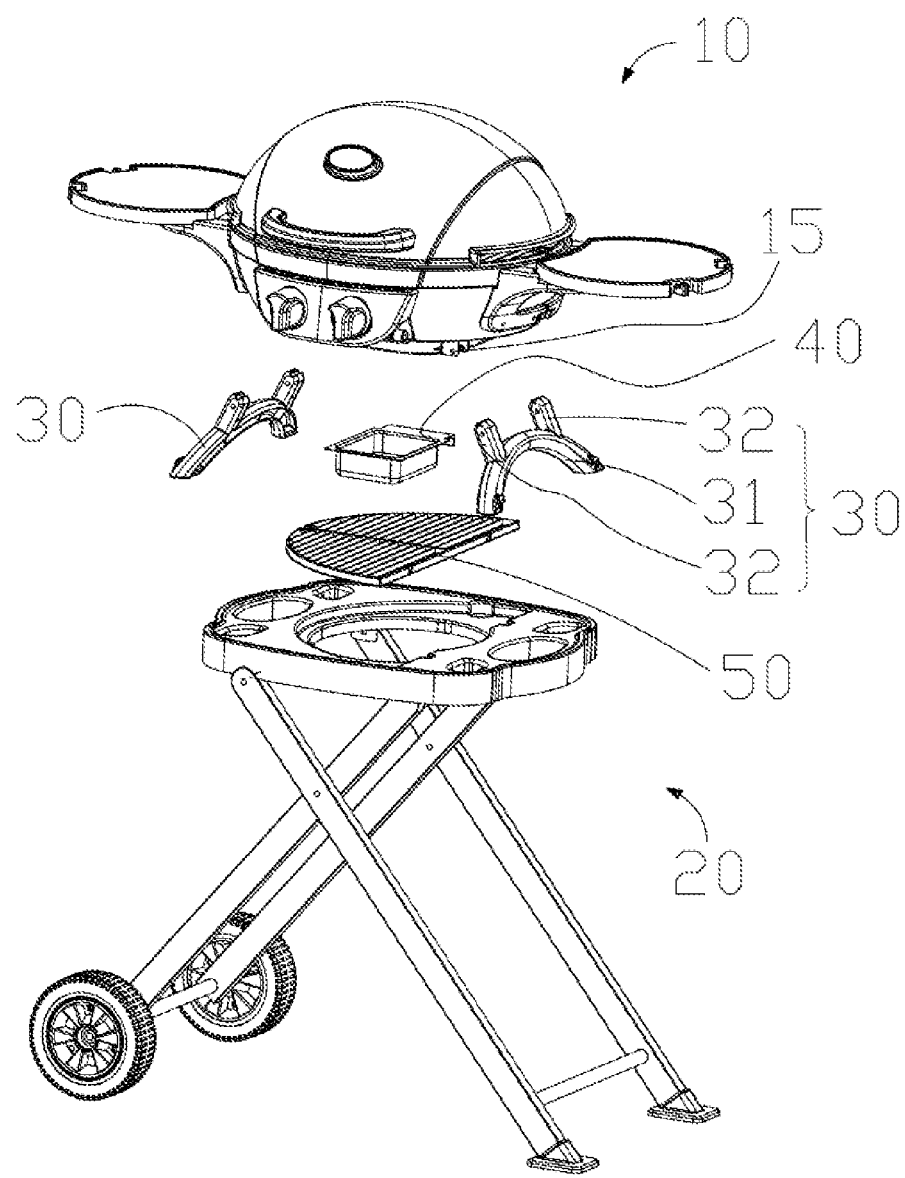
FIG. 2 is a disassembled view of FIG. 1.

With reference to FIG. 1 and FIG. 2, a barbecue grill 100 of the disclosure is used to barbecuing various kinds of foods, such as vegetables and many kinds of meats. In the embodiment, the barbecue grill 100 is a gas barbecue grill. Alternatively, the barbecue grill 100 may be an electronic barbecue grill or a charcoal barbecue grill.

The barbecue grill 100 includes an oven 10, a supporting member 20, and a pair of holders 30 supporting the oven 10. One end of each of the pair of holders 30 pivots on a bottom of the oven 10, and another end of each of the pair of holders 30 is fixed on the supporting member 20.

The supporting member 20 includes a panel 21, a first stand 22, and a second stand 23 in cross connection with the first stand 22 and pivoting on the first stand 22. One end of the first stand 22 pivots on a bottom of the panel 21, and one end of the second stand 23 is fixed with the bottom of the panel 21.

When the pair of holders 30 are detached from the panel 21, the pair of holders 30 stack on the bottom of the oven 10, and when the second stand 23 is detached from the panel 21, the second stand 23 and the panel 21 stack on the first stand 22.

That is, because one end of the first stand 22 is rotatably connected with the bottom of the panel 21, and the second stand 23 pivots on the first stand 22. When the barbecue grill 100 is unused, only by detaching the second stand 23 from the panel 21, the first stand 22 and the second stand 23 fold flat, and the panel 21 stacks on the first stand 22 and the second stand 23. As a result, an occupied area of the barbecue grill 100 is saved, and it is convenient for a consumer to take the barbecue grill 100.

In addition, because the holders 30 pivot on the bottom of the oven 10, if the barbecue grill 100 is unused, the holders 30 rotate to stack on the oven 10, which results of a small cubage of the barbecue grill 100 and convenience for carriage.

Figure 3:
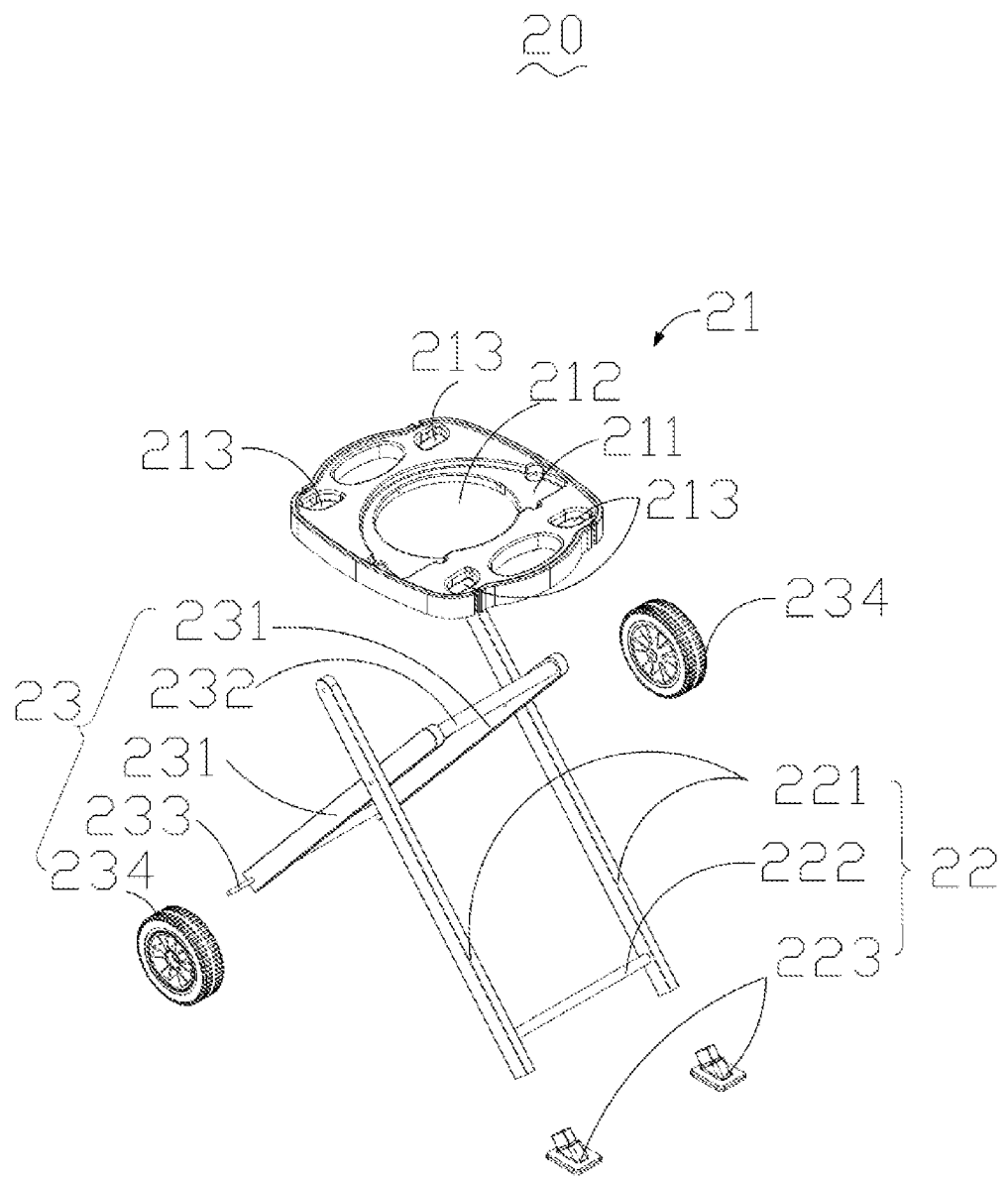
FIG. 3 is a disassembled view of a supporting member of FIG. 1.
Figure 4:
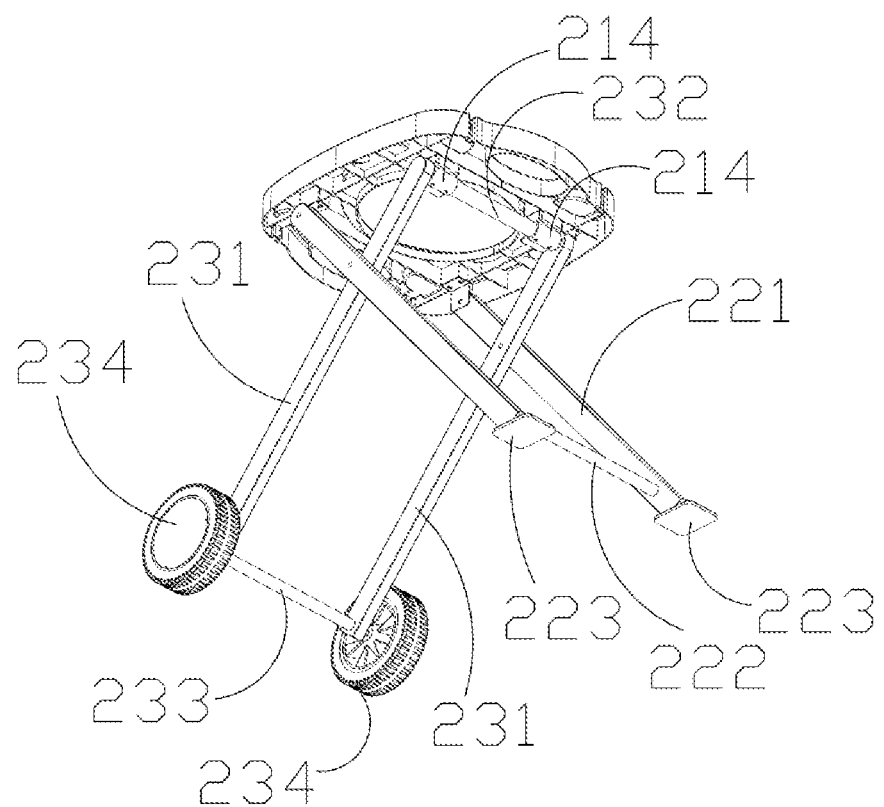
FIG. 4 is an assembled view of the supporting member of FIG. 3.

With reference to FIGS. 3-4, in detail, the first stand 22 includes a pair of first supporting bars 221 parallel with each other, a pair of foot seats 223, and a first connecting bar 222. In assembly, one end of each of the first supporting bars 221 pivots on the bottom of the panel 21, another end of each of the first supporting bars 221 is connected with one of the pair of foot seats 223. The pair of foot seats 223 contact ground to support the first supporting bars 221. The first connecting bar 222 is connected between portions of the first supporting bars 221 which is adjacent to the pair of the foot seats 223.

Correspondingly, the second stand 23 comprises a pair of second supporting bars 231, a pair of wheels 234, a second connecting bar 232, and a third connecting bar 233. The pair of second supporting bars 231 are respectively in cross connection with the pair of first supporting bars 221, and pivot with the pair of first supporting bars 221. In assembly, the second connecting bar 232 is connected between first ends of the pair of second supporting bars 231 and fixed with the bottom of the panel 21. Two ends of the third connecting bar 233 respectively pass through second ends of the pair of second supporting bars 231, and are connected with the pair of wheels 234, respectively.

In the embodiment, the pair of wheels 234 is positioned to move the barbecue grill 100 by rolling the wheels 234, which results in saving of labour during moving the barbecue grill 100 for a long distance, and convenience to the consumer.

Figure 5:
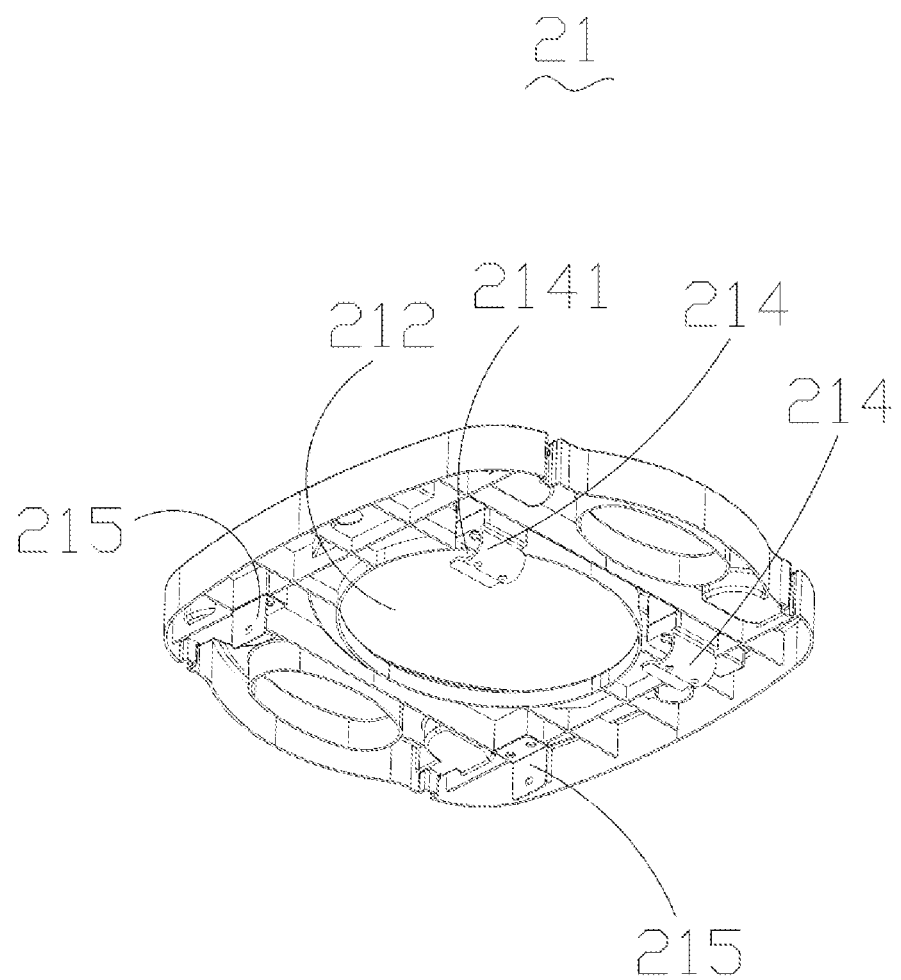
FIG. 5 is a perspective view of a panel of FIG. 3.

With reference to FIG. 5, in the embodiment, the panel 21 comprises a pair of positioning blocks 214 projecting from the bottom of the panel 21, and a pair of positioning sheets 215 projecting from the bottom of the panel 21. Each of the pair of positioning blocks 214 defines a latching groove 2141 in a shape of the character C. In assembly, two ends of the second connecting bar 232 adjacent to the pair of second supporting bars 231 are latched into the latching groove 2141 to secure the second connecting bar 232 on the bottom of the panel 21, and so as to secure one end of the second stand 23 on the panel 21. One end of each of the pair of first supporting bars 221 pivots on a corresponding one of the pair of positioning sheets 215 so as to pivot the first supporting bars 221 on the bottom of the panel 21.

If the supporting member 20 is required to be closed, the second connecting bar 232 escapes from the latching grooves 2141, and the supporting member 20 is folded, which results of convenience for moving the supporting member 20 and reduction of space occupation of the supporting member 20.

With reference to FIG. 3, in the embodiment, the panel 21 defines a receiving slot 211, a first through hole 212 communicating with the receiving slot 211, and two pairs of positioning slots 213 respectively located on two sides of the receiving slot 211. In assembly, the other ends of the holders 30 engage with the corresponding positioning slots 213, respectively, to secure the pair of holders 30 on the panel 21, so as to support the oven 10 on the panel 21. The receiving slot 211 is configured for receiving grills 50 that is replaceable.

Figure 7:
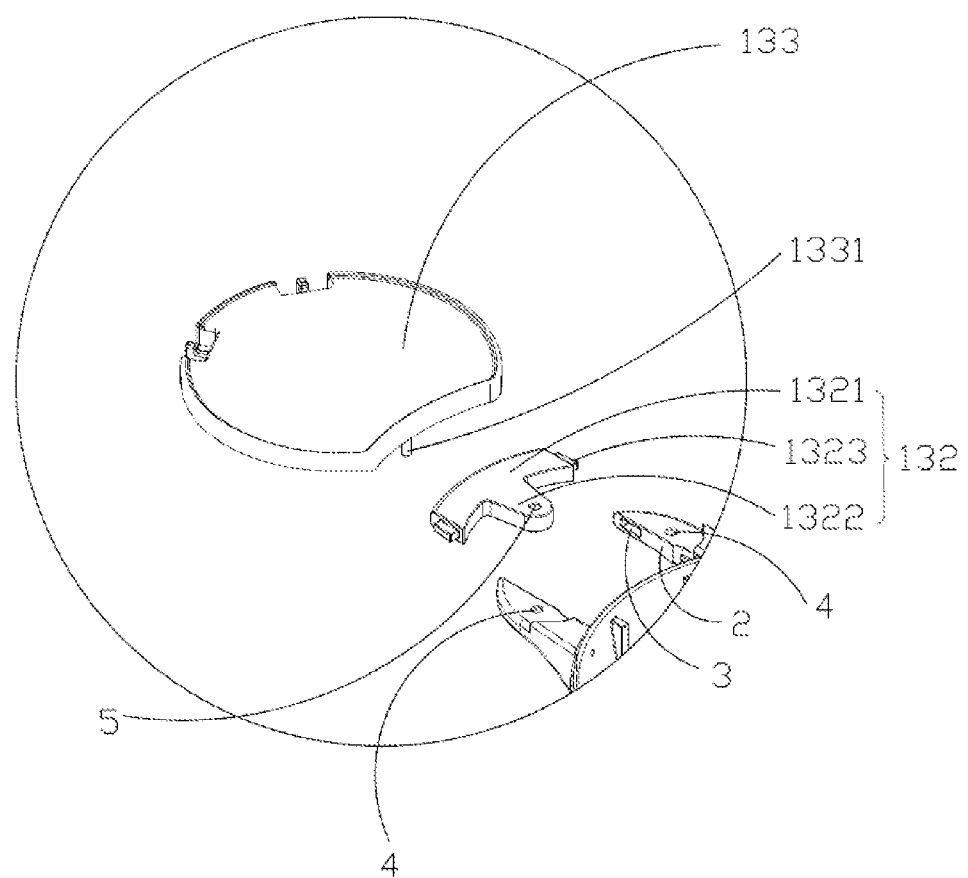
FIG. 7 is an enlarged view of region VII of FIG. 6.

With reference to FIG. 7, the oven 10 comprises a body 11 defining an open on a top of the body 11, a cover 12 rotatably connected with the body 11, and a pair of opposite supporting assemblies 13 located on two ends of the body 11.

In the embodiment, each of the pair of supporting assemblies 13 comprises a handle 131 from an exterior surface of the body 11, a supporting block 132 latched with the handle 131, and a supporting plate 133 located upon the supporting block 132 and fixed with the handle 131.

Figure 6:
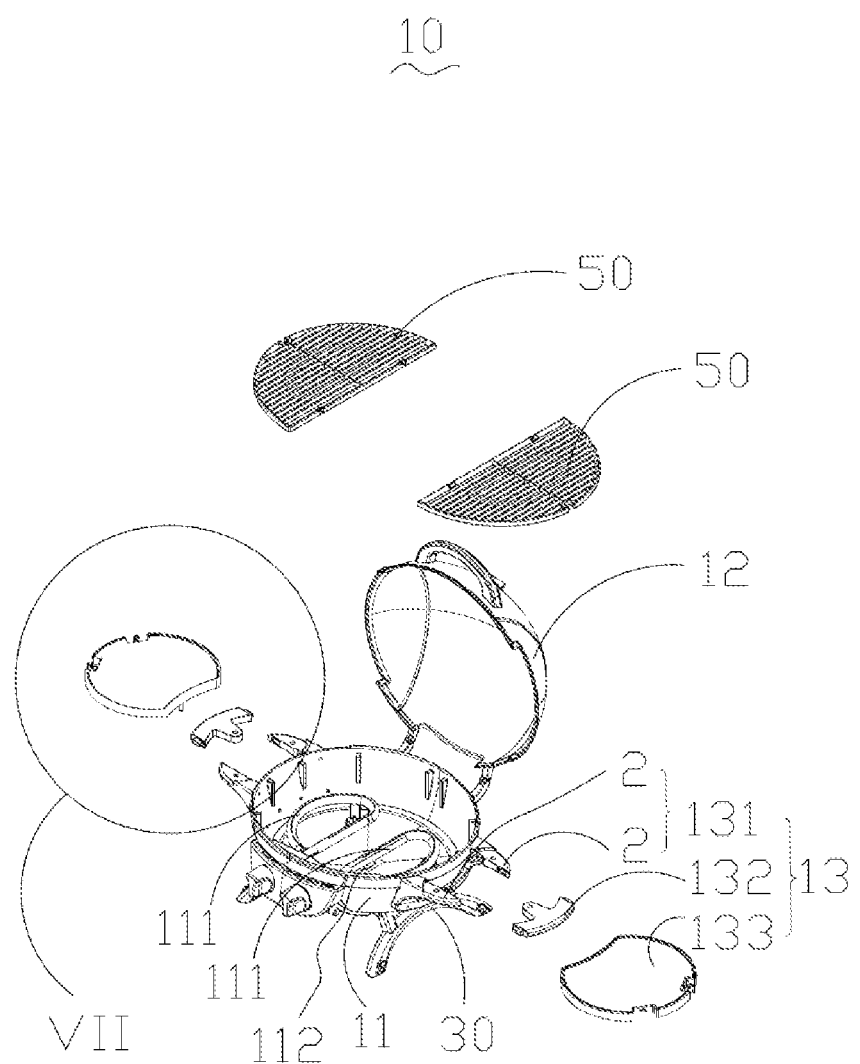
FIG. 6 is a disassembled view of an oven of FIG. 2.

With reference to FIGS. 6-7, in detail, the handle 131 comprises a pair of latching blocks 2 parallel with each other. Each of the pair of latching blocks 2 defines a latching groove 3 located on a side of the latching block 2, and a first inserting hole 4 located on a top of the latching block 2. The supporting block 132 comprises a first positioning portion 1321 and a second positioning portion 1322 extending from a middle portion of the first positioning portion 1321. The first positioning portion 1321 comprises a pair of projections 1323 projecting from two ends of the first positioning portion 1321, respectively, and the second positioning portion 1322 defines a second inserting hole 5. In assembly, the pair of projections 1323 engage with the pair of latching grooves 3 to secure the supporting block 132 between the latching blocks 2 of the handle 131.

The supporting plate 133 comprises posts 1331 projecting from a bottom of the supporting plate 133 and corresponding to the first inserting hole 4 and the second inserting hole 5. In assembly, the posts 1331 respectively insert into the first inserting hole 4 and the second inserting hole 5 to secure the supporting plate 133 on the body 11 of the oven 10.

When the barbecue grill 100 is unused, the posts 1331 of the supporting plate 133 escape from the first and second inserting holes 4, 5 to detach the supporting plate 133 from the handle 131 and the supporting block 132. The projections 1323 of the first positioning portion 1321 escape from the latching grooves 3 of the latching block 2 to detach the supporting block 132 from the handle 131. The detached supporting plates 133 and the detached supporting blocks 132 are placed into the body 11 of the oven 10.

It follows that, it is easy for the consumer to assemble or disassemble the supporting plates 133 and the supporting blocks 132, which results of convenience for the consumer. In addition, the detached supporting plates 133 and the supporting blocks 132 are placed into the body 11 of the oven 10, which results of reduction of the cubage of the barbecue grill 100, and convenience of carriage.

With reference to FIG. 6, the body 11 comprises at least two burners 111 located inside the body 11, and at least two grills 50 corresponding to the burners 111. The burners 111 are connected to a gas tank, and are configured to burn gas to barbecue the food on the grills 50.

Each grill 50 is located upon a corresponding burners 111 and is configured for placing different foods. In the embodiment, two burners 111 are located inside the body 11, and each burner 111 corresponds to a grill 50. As a result, different kinds of food can be laid on different grills 50 to be roasted at the same time, and fire of each of the burners 111 is adjusted solely according to features of the food laid on the corresponding grill 50. That is, the barbecue grill 100 of the disclosure roasts different kinds of food at the same time, and the consumer can taste different kinds of food at the same time.

The cover 12 is rotatably connected with the body 11, and located upon the body 11 to cover the open of the body 11. In the embodiment, the cover 12 is in a shape of an half of a ball. As a result, heat generated from the food can be dispersed uniformly, and the food is roasted uniformly, which avoids that one part of food is burnt and another part of food is still raw.

In the embodiment, each burner 111 defines a plurality of gas holes, and each grill 50 comprises a shield strip located under the grill. In assembly, the shield strip is opposite to the plurality of gas holes of the corresponding burner 111 so as to prevent oil from being dropping into the gas holes to block the gas holes.

Figure 8:
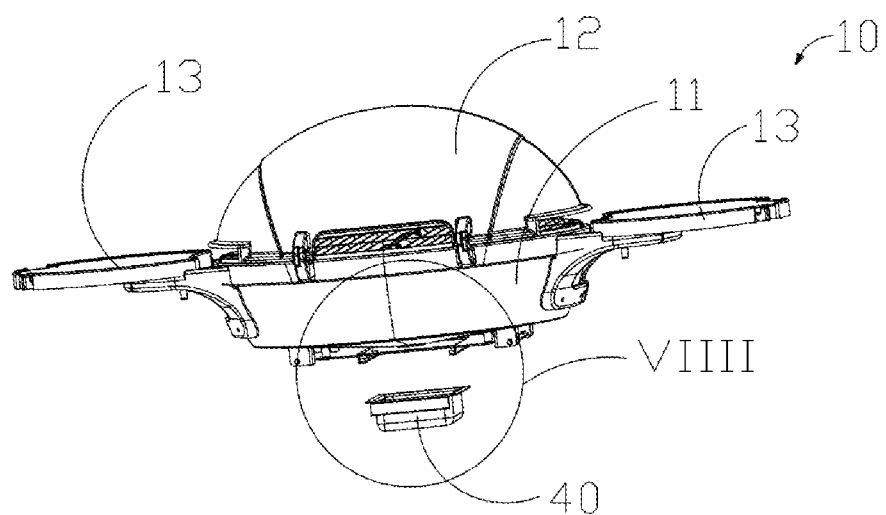
FIG. 8 is assembled view of the oven of FIG. 6, and wherein FIG. 8 also shows an oil plate secured on a bottom of the oven.
Figure 9:
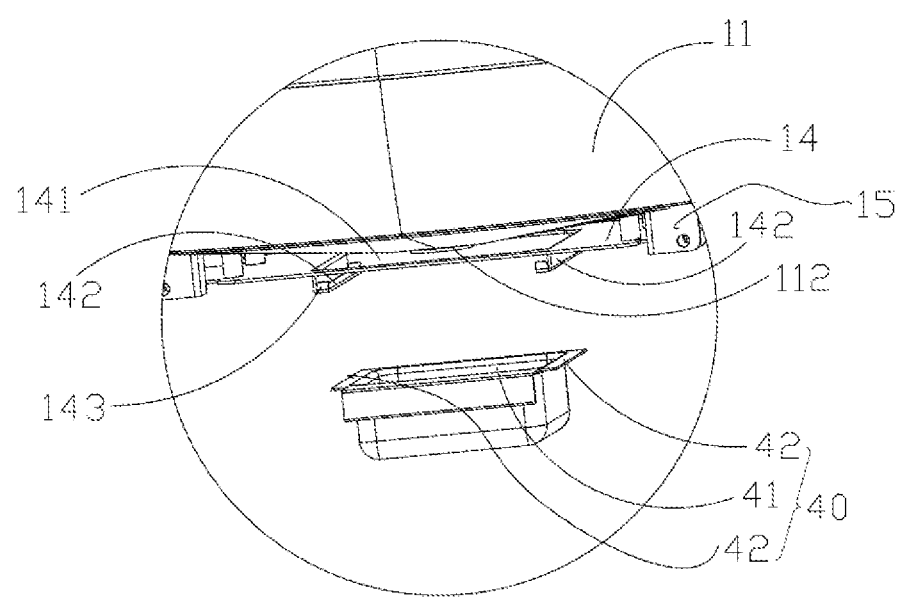
FIG. 9 is an enlarged view of region VIIII portion of FIG. 8.

With reference to FIG. 6, FIG. 8 and FIG. 9, in the embodiment, the oven 10 defines an oil leaking hole 112 on the bottom of the oven 10. The barbecue grill 100 further comprises an oil plate 40 located between the panel 21 of the supporting member 20 and the oven 10, and fixed on the bottom of the oven 10. The oil plate 40 defines an oil receiving open 41 opposite to the oil leaking hole 112 of the oven 10.

With reference to FIG. 2, each of the pair of holders 30 comprises a supporting rod 31 in a shape of an arc, and a pair of pivoting portions 32 projecting from the supporting rod 31. The oven 10 comprises a pair of pivoting sheets 15 projecting from the bottom of the oven 10 and corresponding to the pair of pivoting portions 32. In assembly, the pair of pivoting portions 32 pivot on the pair of pivoting sheets 15, respectively to ensure the pair of holders 30 to pivot on the bottom of the oven 10.

In the embodiment, the bottom of the body 11 is in a shape of a cone. Oil leaking from the grills 50 flows along surface of the cone shaped bottom of the body 11 to the oil plate 40 via the oil leaking hole 112 of the body 11. As a result, the oil leaking from the grills 50 does not stay on the oven 10, which prevents the oven 10 from being firing, and easiness of cleaning the oven 10.

In the embodiment, the oven 10 comprises a supporting board 14 fixed on the bottom of the oven 10. The supporting board 14 defines a second through hole 141 in communication with the oil receiving open 41 of the oil plate 40. The supporting board 14 comprises a pair of supporting strips 142 located on two sides of the second through hole 141, respectively, and extending from the two sides of the second through hole 141 and far away the oven 10. The oil plate 40 comprises a pair of flanges 42 located on two sides of the oil receiving open 41. In assembly, the pair of flanges 42 are located upon the pair of supporting strips 142 of the supporting board 14 to hang the oil plate 40 on the supporting board 14.

In the embodiment, each of the pair of supporting strips 142 comprises a pair of stopping blocks 143 located on two end of the supporting strip 142. In assembly, one of the pair of flanges 42 of the oil plates 40 is stopped between the pair of stopping blocks 143 of a corresponding one of the pair of supporting strips 142. When the oil in the oil plate 40 is required to be dropped, the oil plate 40 is pushed toward the oven 10, and is draw out to escape from gap between the supporting board 14 and the stopping blocks 143 of the supporting strips 142.

Although the features and elements of the present disclosure are described as embodiments in particular combinations, each feature or element can be used alone or in other various combinations within the principles of the present disclosure to the full extent indicated by the broad general meaning of the terms in which the appended claims are expressed.

What is claimed is:

1. A barbecue grill, comprising:
an oven; a supporting member comprising a panel, a first stand, and a second stand in cross connection with the first stand and pivoting on the first stand, wherein one end of the first stand pivots on a bottom of the panel, and one end of the second stand is fixed with the bottom of the panel; and a pair of holders supporting the oven, one end of each of the pair of holders pivoting on a bottom of the oven, and another end of each of the pair of holders fixed on the supporting member; wherein when the pair of holders are detached from the panel, the pair of holders stack on the bottom of the oven, and when the second stand is detached from the panel, the second stand and the panel stack on the first stand;

wherein the oven comprises a body defining an open on a top of the body, a pair of opposite supporting assemblies located on two ends of the body; and wherein each of the pair of supporting assemblies comprises a handle projecting from an exterior surface of the body, a supporting block latched with the handle, and a supporting plate located upon the supporting block and fixed with the handle.

2. The barbecue grill of claim 1, wherein the first stand comprises a pair of first supporting bars parallel with each other, a pair of foot seats, and a first connecting bar; wherein one end of each of the first supporting bar pivots on the bottom of the panel, another end of each of the first supporting bar is connected with one of the pair of foot seats, and the first connecting bar is connected between portions of the first supporting bars which is adjacent to the pair of the foot seats; wherein the second stand comprises a pair of second supporting bars, a pair of wheels, a second connecting bar, and a third connecting bar; and wherein the pair of second supporting bars are respectively in cross connection with the pair of first supporting bars, and pivot with the pair of first supporting bars, the second connecting bar is connected between first ends of the pair of second supporting bars and fixed with the bottom of the panel, and two ends of the third connecting bar respectively pass through second ends of the pair of second supporting bars, and are connected with the pair of wheels, respectively.

3. The barbecue grill of claim 2, wherein the panel comprises a pair of positioning blocks projecting from the bottom of the panel, and a pair of positioning sheets projecting from the bottom of the panel; wherein each of the pair of positioning blocks defines a latching groove in a shape of the character C, two ends of the second connecting bar adjacent to the pair of second supporting bars are latched into the latching groove to secure the second connecting bar on the bottom of the panel, so as to secure one end of the second stand on the panel; and wherein one end of each of the pair of first supporting bars pivots on a corresponding one of the pair of positioning sheets.

4. The barbecue grill of claim 2, wherein the panel defines a receiving slot, a first through hole communicating with the receiving slot, and two pairs of positioning slots respectively located on two sides of the receiving slot; and wherein the other ends of the holders engage with the two pairs of positioning slots, respectively, to secure the pair of holders on the panel.

5. The barbecue grill of claim 1, wherein the handle comprises a pair of latching block parallel with each other, each of the pair of latching block defines a latching groove located on a side of the latching block, and a first inserting hole located on a top of the latching block; wherein the supporting block comprises a first positioning portion and a second positioning portion extending from a middle portion of the first positioning portion; wherein the first positioning portion comprises a pair of projections projecting from two ends of the first positioning portion, respectively, and the second positioning portion defines a second inserting hole; wherein the pair of projections engage with the pair of latching grooves to secure the supporting block between the latching blocks of the handle; wherein the supporting plate comprises posts projecting from a bottom of the supporting plate and corresponding to the first inserting hole and the second inserting hole; and wherein the posts respectively insert into the first inserting hole and the second inserting hole to secure the supporting plate on the oven.

6. The barbecue grill of claim 1, wherein the oven defines an oil leaking hole on the bottom of the oven, and the barbecue grill further comprises an oil plate located between the panel of the supporting member and the oven, and fixed on the bottom of the oven, and wherein the oil plate defines an oil receiving open opposite to the oil leaking hole of the oven; wherein each of the pair of holders comprises a supporting rod in a shape of an arc, and a pair of pivoting portions projecting from the supporting rod; wherein the oven comprises a pair of pivoting sheets projecting from the bottom of the oven and corresponding to the pair of pivoting portions; and wherein the pair of pivoting portions pivot on the pair of pivoting sheets, respectively to ensure the pair of holders to pivot on the bottom of the oven.

7. The barbecue grill of claim 6, wherein the oven comprises a supporting board fixed on the bottom of the oven, the supporting board defines a second through hole in communication with the oil receiving open of the oil plate; wherein the supporting board comprises a pair of supporting strips located on two sides of the second through hole, respectively, and extending from the two sides of the second through hole and far away the oven; and wherein the oil plate comprises a pair of flanges located on two sides of the oil receiving open, and wherein the pair of flanges are located upon the pair of supporting strips to hang the oil plate on the supporting board.

8. The barbecue grill of claim 7, wherein each of the pair of supporting strips comprises a pair of stopping blocks located on two end of the supporting strip, one of the pair of flanges of the oil plates is stopped between the pair of stopping blocks of a corresponding one of the pair of supporting strips.

9. The barbecue grill of claim 1, wherein the oven further comprises a cover rotatably connected with the body, and located upon the body to cover the open of the body, and wherein the cover is in a shape of an half of a ball.

* * * * *